United States Patent
Hamada (10) Patent No.: US 9,321,497 B2
(45) Date of Patent: Apr. 26, 2016

(54) ARTICLE STORAGE STRUCTURE FOR MOTORCYCLE

(71) Applicant: HONDA MOTOR CO., LTD., Tokyo (JP)

(72) Inventor: Natsumi Hamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/666,911

(22) Filed: Mar. 24, 2015

(65) Prior Publication Data

US 2015/0274232 A1 Oct. 1, 2015

(30) Foreign Application Priority Data

Mar. 31, 2014 (JP) .................. 2014-073467

(51) Int. Cl.
*B62J 9/00* (2006.01)
*B62J 35/00* (2006.01)
*B62K 19/46* (2006.01)

(52) U.S. Cl.
CPC *B62J 9/008* (2013.01); *B62J 35/00* (2013.01); *B62K 19/46* (2013.01)

(58) Field of Classification Search
CPC ............ B62J 9/008; B62J 9/001; B62K 11/02
USPC ........................................................ 180/219
See application file for complete search history.

(56) References Cited

U.S. PATENT DOCUMENTS

| | | | | |
|---|---|---|---|---|
| 4,059,207 A * | 11/1977 | Jackson | ................. | A45C 13/00 224/153 |
| 4,258,869 A * | 3/1981 | Hilgendorff | ............. | A45F 3/00 224/408 |
| 4,442,960 A * | 4/1984 | Vetter | ........................ | B62J 9/00 190/108 |
| 4,580,706 A * | 4/1986 | Jackson | ..................... | B62J 9/00 224/417 |
| 5,586,703 A * | 12/1996 | Radar | ........................ | A45F 3/04 224/148.2 |
| 5,890,639 A * | 4/1999 | Hancock | .................. | A45C 3/00 224/42.11 |
| 6,547,113 B1 * | 4/2003 | Hancock | .................. | B62J 9/003 224/408 |
| 7,568,600 B2 * | 8/2009 | Godshaw | ................. | B62J 9/008 224/429 |
| D607,638 S * | 1/2010 | Hensley | ..................... | B62J 9/00 D32/231 |
| 8,955,728 B2 * | 2/2015 | Schultze | .................. | B62J 9/008 224/413 |
| 2008/0083635 A1 * | 4/2008 | Andersen | ............. | A45C 7/0095 206/374 |
| 2011/0073628 A1 * | 3/2011 | Inoue | ..................... | B62K 19/46 224/488 |

FOREIGN PATENT DOCUMENTS

JP 7-215253 A 8/1995

* cited by examiner

*Primary Examiner* — Tony Winner
*Assistant Examiner* — Michael Stabley
(74) *Attorney, Agent, or Firm* — Birch, Stewart, Kolasch & Birch, LLP (57) ABSTRACT

An article storage section is formed without involving an increase in weight in a motorcycle which includes a vehicle body frame having a head pipe steerably supporting a steering handlebar and a main frame extending rearwardly and downwardly from the head pipe. A riding seat is supported by the vehicle body frame with a fuel tank disposed between the steering handlebar and the riding seat. The riding seat is supported by the main frame. An article storage section is disposed in front of the riding seat, and further outwardly relative to the fuel tank. A pair of left and right side bags are openably and closably supported by the fuel tank in a way so that the article storage section is formed between each side bag and an outer side surface of the fuel tank.

16 Claims, 6 Drawing Sheets

ARTICLE STORAGE STRUCTURE FOR MOTORCYCLE

CROSS-REFERENCE TO RELATED APPLICATIONS

The present application claims priority under 35 USC 119 to Japanese Patent Application No. 2014-073467 filed Mar. 31, 2014 the entire contents of which are hereby incorporated by reference.

BACKGROUND OF THE INVENTION

1. Field of the Invention

The present invention relates to a motorcycle which includes a vehicle body frame having a head pipe steerably supporting a steering handlebar, and a main frame extending rearwardly and downwardly from the head pipe with a riding seat supported by the vehicle body frame. A fuel tank is disposed between the steering handlebar and the riding seat and is supported by the main frame. An article storage section is disposed in front of the riding seat and further outward than the fuel tank. More particularly, the present invention relates to improvement with respect to the article storage section.

2. Description of Background Art

Japanese Patent Application Publication No. Hei. 7-215253 discloses a motorcycle wherein an article storage section is formed inside a cowling which, from the sides, covers a front portion of a fuel tank supported by a main frame extending rearwardly and downwardly from a head pipe steerably supporting a steering handlebar. A lid for opening and closing the article storage section is supported by the cowling.

The configuration in which the lid is supported by the cowling as disclosed in Japanese Patent Application Publication No. Hei. 7-215253, however, requires reinforcement for increasing the strength and rigidity of the cowling. The reinforcement involves an increase in weight.

SUMMARY AND OBJECTS OF THE INVENTION

The present invention has been made with the foregoing situation taken into consideration. An object of an embodiment of the present invention is to provide an article storage structure for a motorcycle that is capable of forming an article storage section without involving an increase in weight.

For the purpose of solving the above-mentioned problems, the present invention provides an embodiment wherein a motorcycle includes a vehicle body frame including a head pipe steerably supporting a steering handlebar and a main frame extending rearwardly and downwardly from the head pipe with a riding seat supported by the vehicle body frame. A fuel tank is disposed between the steering handlebar and the riding seat and is supported by the main frame. An article storage section is disposed in front of the riding seat and further outward than the fuel tank. The present invention has a first aspect wherein a pair of left and right side bags are openably and closably supported by the fuel tank in a way so that the article storage section is formed between each side bag and an outer side surface of the fuel tank.

According to an embodiment of the present invention, the side bags are supported by the fuel tank in a way that enables that the side bags to turn on axes of pivots disposed lower than a bottom face of the fuel tank.

According to an embodiment of the present invention, the pivots are supported by a stay which is fixedly provided to the fuel tank in a way that the stay extends further downwardly than the bottom face of the fuel tank wherein a lower end of the stay is disposed higher than a lower edge of each side bag in a closed state.

According to an embodiment of the present invention, fixing members to which an elastic string or a side carrier can be fixed, and a hook wherein the elastic string is brought into detachable engagement in the way that the elastic string forms a second article storage section in cooperation with an outer side surface of the side bag, are fixed to the outer side surface of the side bag.

According to an embodiment of the present invention, the article storage sections are formed between the pair of left and right side bags, which are openably and closably supported by the highly strong and rigid fuel tank, and the outer side surface of the fuel tank. For this reason, it is possible to securely support the side bags without much reinforcement, and to form the article storage sections without involving an increase in the weight.

According to an embodiment of the present invention, the pivots turnably supporting the side bags are disposed lower than the bottom face of the fuel tank. For this reason, it is possible to increase the volume of the article storage sections by enlarging the side bags, and to increase their loading capacity.

According to an embodiment of the present invention, the stay is fixedly provided to the fuel tank so as to support the pivots and extends further downwardly than the bottom face of the fuel tank in a way that the lower end of the stay is disposed higher than the lower edge of each side bag in the closed state. For this reason, it is possible to make the stay less visible from the outside by covering the stay with the side bag from the outside, and accordingly to enhance the external appearance.

According to an embodiment of the present invention, the loading capacity can be increased further by fixing the side carrier to the fixing members, or by forming the second article storage section by bringing the elastic string, which is fixed to the fixing members, into engagement with the hook.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Descriptions will be hereinbelow provided for embodiments of the present invention, referring to the attached drawings. It should be noted that the front, rear, left, right, top and bottom in the following descriptions are directions seen from a rider seated on a motorcycle.

Figure 1:
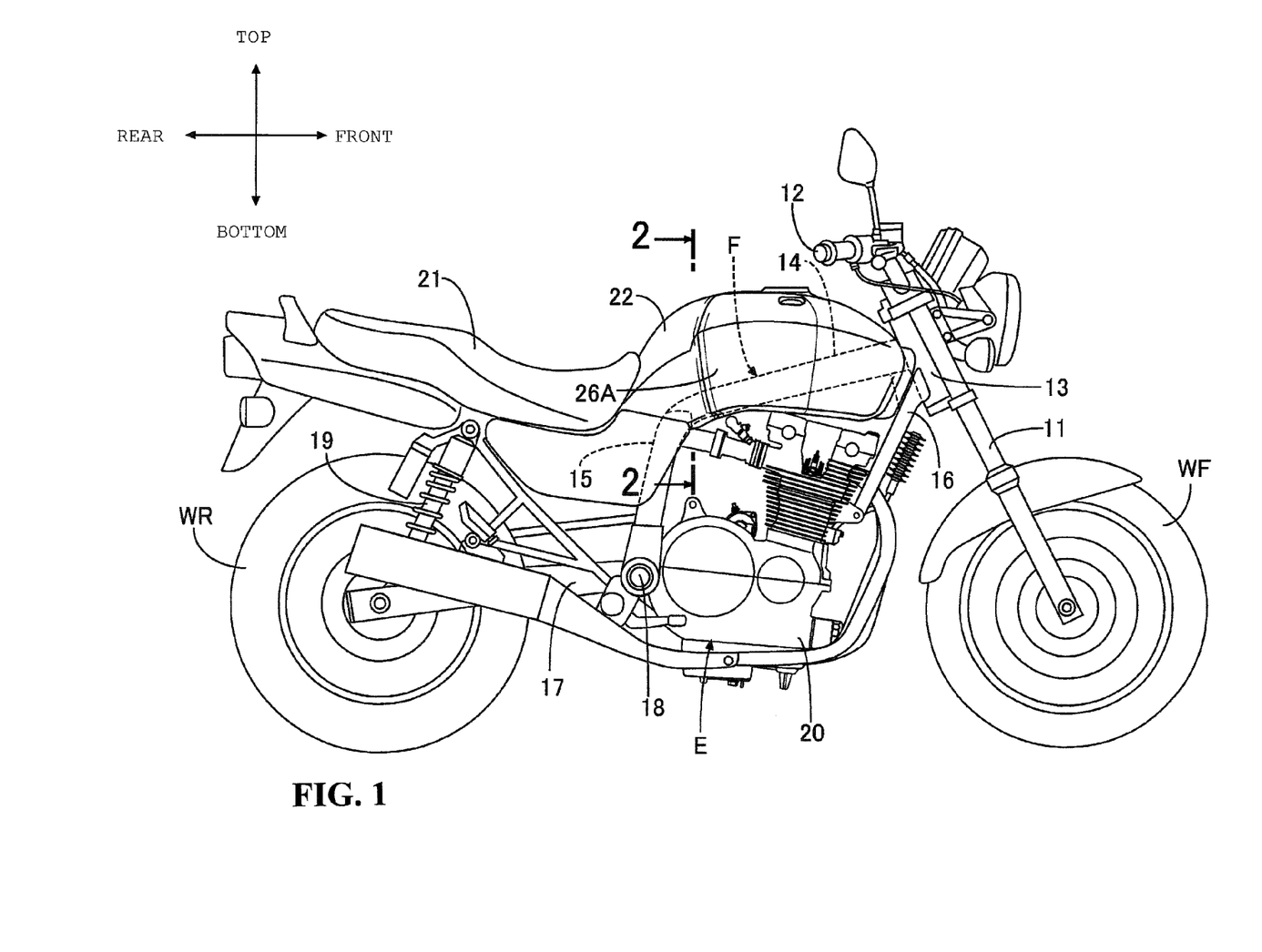
FIG. 1 is a right side view of a motorcycle of a first embodiment.
Figure 2A:
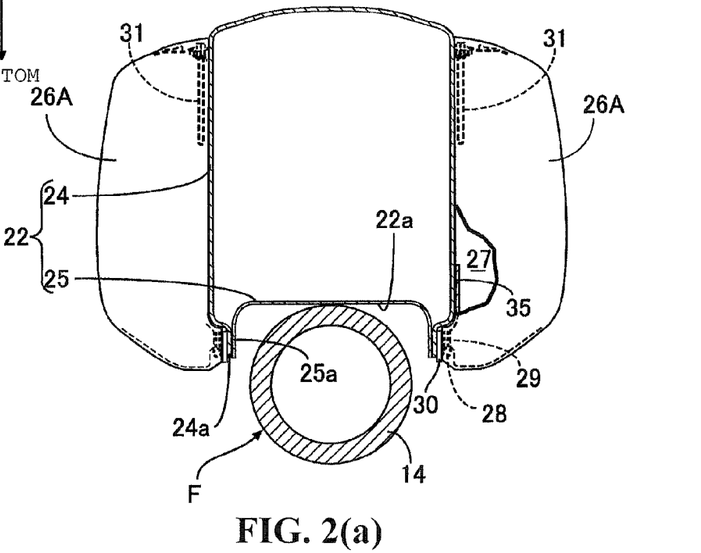
FIGS. 2(a) and 2(b) are cross-sectional views of side bags, where 2(a) is closed and 2(b) opened, taken along the 2-2 line of FIG. 1.
Figure 2B:
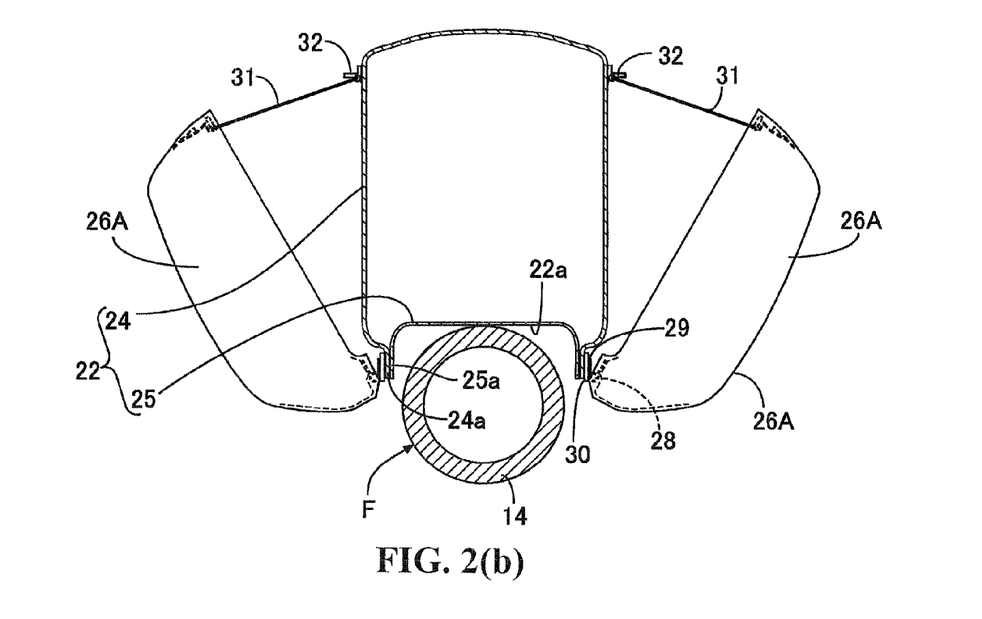
Figure 3:
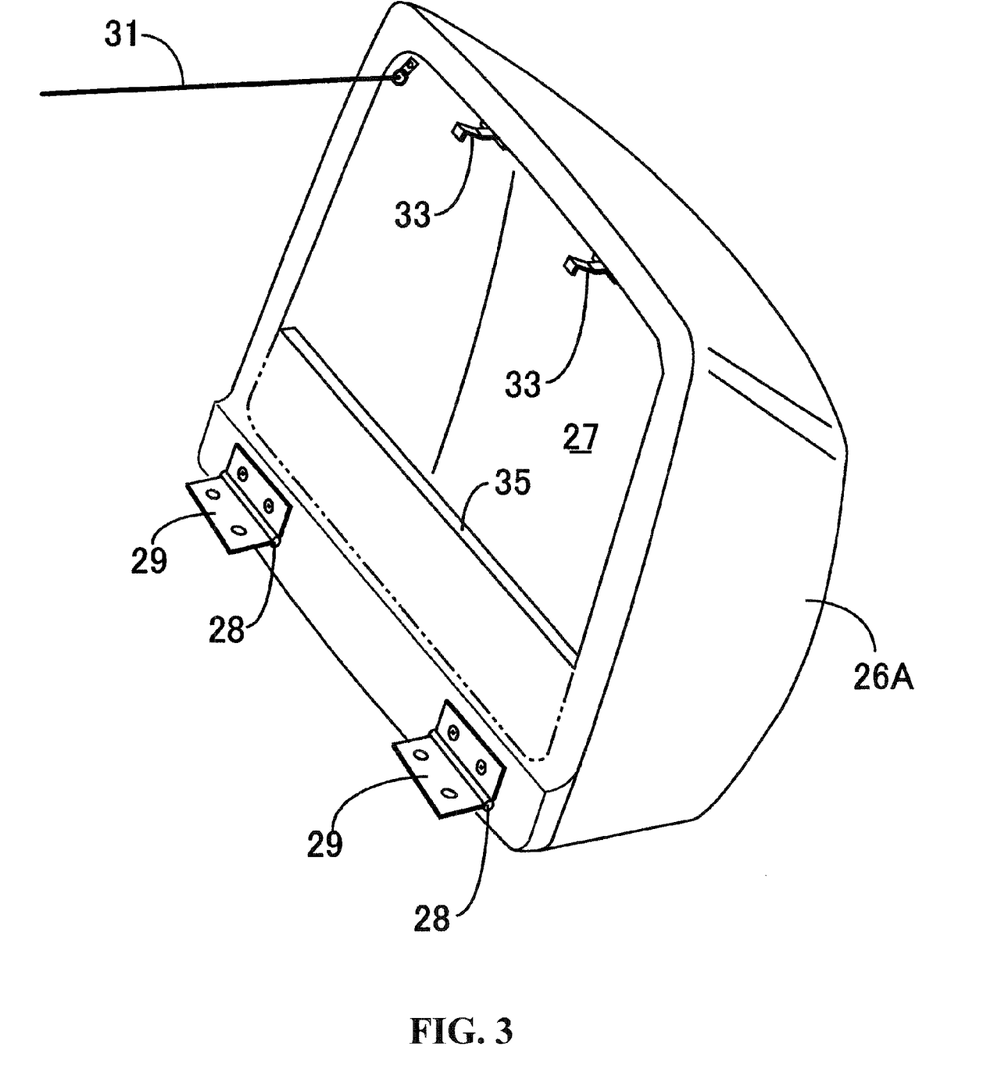
FIG. 3 is a perspective view of a side bag from inside.

A first embodiment of the present invention is illustrated in FIGS. 1 to 3. In FIG. 1 a vehicle body frame F of the motorcycle includes a head pipe 13 configured to steerably support a front fork 11 whose lower end portions pivotally support a front wheel WF, and a bar-shaped steering handlebar 12. A main frame 14 extends rearwardly and downwardly from the head pipe 13 with a center frame 15 extending downwardly from the rear end of the main frame 14. A down frame 16 extends rearwardly and downwardly from the head pipe 13 more steeply than the main frame 14. The main frame 14 and the center frame 15 are formed as a single unit.

A front end portion of a swing arm 17 whose rear end portion pivotally supports a rear wheel WR is swingably supported by a lower portion of the center frame 15 with the assistance of a pivot 18. A rear shock absorber 19 is provided between a rear portion of the swing arm 17 and the vehicle body frame F.

An engine body 20 of an internal combustion engine E, configured to produce force for driving the rear wheel WR, is disposed under the main frame 14, and is supported by the down frame 16 and the center frame 15.

A riding seat 21 is disposed rearwardly of the engine body 20, and is supported on the vehicle body frame F. A fuel tank 22, disposed between the riding seat 21 and the steering handlebar 12, is supported by the main frame 14 of the vehicle body frame F.

In FIG. 2, the fuel tank 22 is formed from a tank body 24 and a bottom plate 25 that are connected together by joining, such as welding, joint flanges 24a, 25a provided, respectively, to an open end of the tank body 24 and an outer peripheral portion of the bottom plate 25. A lower portion of the tank body 24 is opened, and a cross section of the tank body 24 is shaped almost like the letter U. The bottom plate 25 closes a lower end of the tank body 24.

A pair of left and right side bags 26A are openably and closably supported by the fuel tank 22 in a way so that article storage sections 27 are formed between the side bags 26A and the outer side surface of the fuel tank 22.

Referring to FIG. 3, each side bag 26A is opened toward the fuel tank 22 and is shaped like a bowl. The side bag 26A is supported by the fuel tank 22 in a way that the side bag 26A is turnable on the axes of the respective pivots 28 which are disposed lower than a bottom face 22a of the fuel tank 22, namely, a bottom surface of the bottom plate 25. In other words, the side bag 26A is turnable between a closed state shown in FIG. 2(a) and an opened state shown in FIG. 2(b).

Each pivot 28 constitutes part of the corresponding hinge 29. A pair of left and right hinges 29 are provided between the corresponding side bag 26A and a stay 30 which is fixedly provided to the fuel tank 22 in a way that the stay 30 extends further downwardly than the bottom face 22a of the fuel tank 22.

The stay 30 extends further downwardly than the joint flange 24a of the tank body 24 in a way that a lower end of the stay 30 is disposed higher than a lower edge of the side bag 26A.

Furthermore, a wall portion 35 configured to form a pocket shape in a lower portion of the side bag 26A is integrally provided to a lower portion of an open end of the side bag 26A. The pocket shape is configured to prevent articles contained inside the side bag 26A from falling out when the side bag 26A is opened.

In addition, a string member 31, configured to restrict the turn of the side bag 26A in an opening direction, is provided between the side bag 26A and the fuel tank 22. Furthermore, a pair of left and right lock protrusions 32 configured to hold the side bag 26A in the closed state by being detachably fitted into a receiving member 32 provided to the fuel tank 22 is provided to an upper portion of the open end of the side bag 26A.

The side bag 26A in the closed state bulges out from the fuel tank 22, but is formed in a way that the side bag 26A bulges further outwardly than a footrest 23.

Next, descriptions will be provided for how the first embodiment works. Since the pair of left and right side bags 26A are openably and closably supported by the fuel tank 22 in the way that the article storage sections 27 are formed between the side bags 26A and the outer side surface of the fuel tank 22, the article storage sections 27 are formed between the pair of left and right side bags 26A, which are openably and closably supported by the highly strong and rigid fuel tank 22, and the outer side surface of the fuel tank 22. Thus, it is possible to securely support the side bags 26A without much reinforcement, and to form the article storage sections 27 without involving an increase in weight. Furthermore, the secure support of the side bags 26A makes it possible to form the side bags 26A in a shape that bulges further outwardly, and accordingly to secure larger loading capacity for articles in the side bags 26A.

Moreover, since each side bag 26A is supported by the fuel tank 22 in the way that the side bag 26A is turnable on the axes of the pivots 28 which are disposed lower than the bottom face 22a of the fuel tank 22, it is possible to increase the volume of the corresponding article storage section 27 by enlarging the side bag 26A, and to increase its loading capacity.

Furthermore, since the pivots 28 are supported by the stay 30 which is fixedly provided to the fuel tank 22 in the way that the stay 30 extends further downwardly than the bottom face 22a of the fuel tank 22, and since the lower end of the stay 30 is disposed higher than the lower edge of the side bag 26A in the closed state, it is possible to make the stay 30 less visible from the outside by covering the stay 30 with the side bag 26A from outside, and accordingly to enhance the external appearance.

Figure 4:
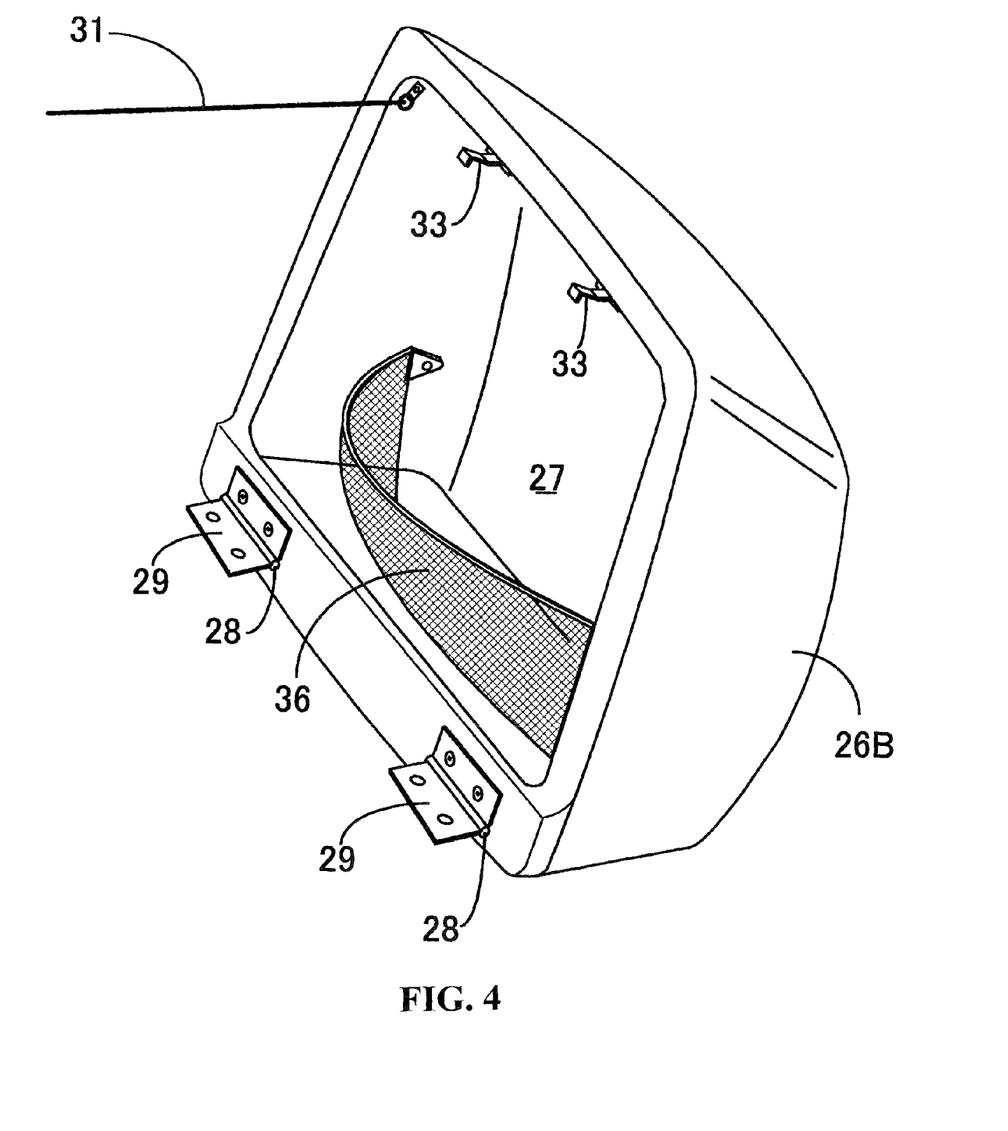
FIG. 4 is a perspective view of a second embodiment, which corresponds to FIG. 3.

FIG. 4 shows a second embodiment of the present invention. Parts corresponding to those in the first embodiment are illustrated with the same reference signs and detailed descriptions for such parts will be omitted.

Each side bag 26B openably and closably attached to the fuel tank 22 (see the first embodiment) is opened to the fuel tank 22, and is shaped like a bowl. A net-shaped member 36 configured to prevent articles contained inside the side bag 26B from falling out when the side bag 26B is opened is attached to an inner surface of the side bag 26B.

The second embodiment can bring about the same effects as can the first embodiment.

Figure 5:
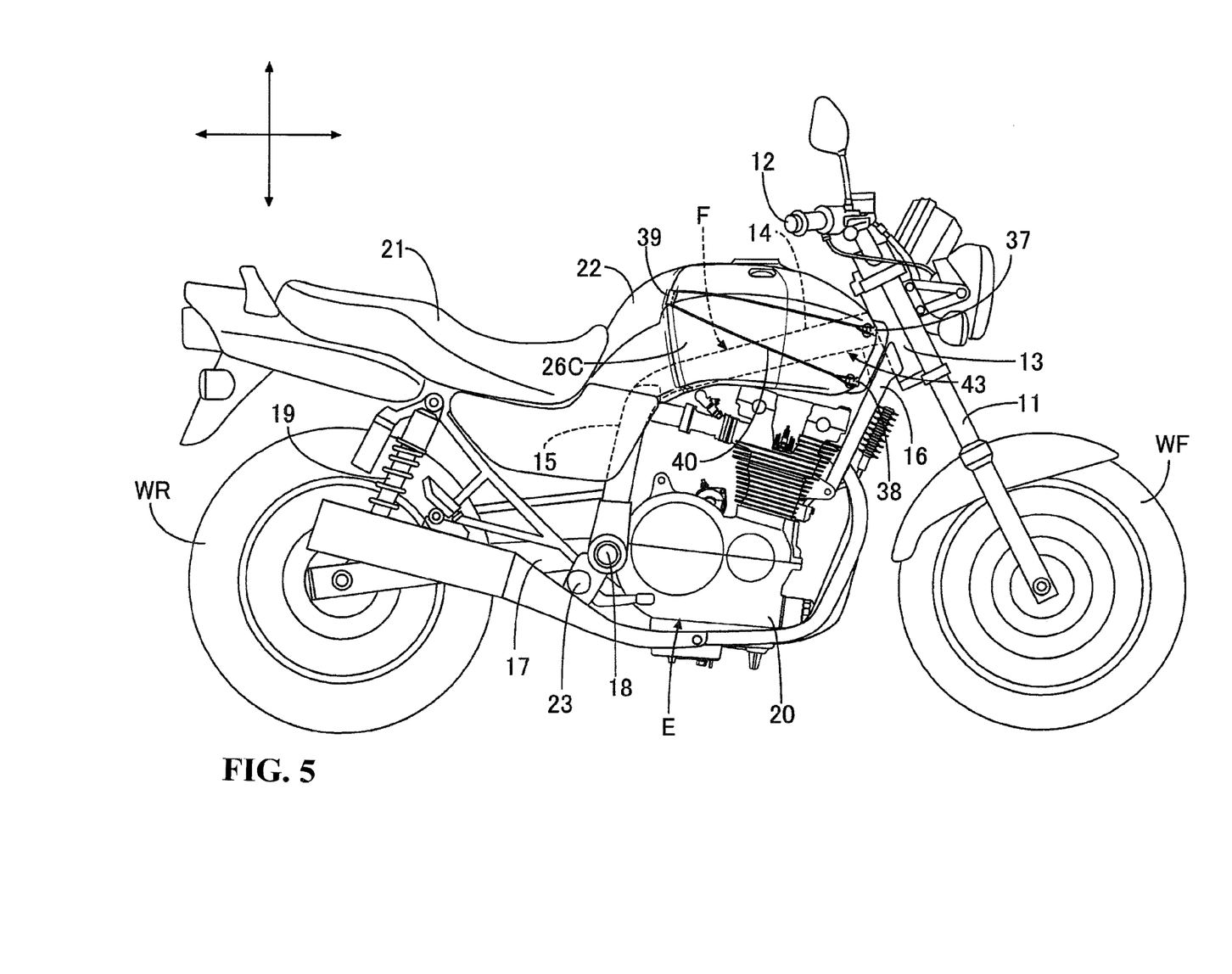
FIG. 5 is a right side view of a motorcycle of a third embodiment.
Figure 6:
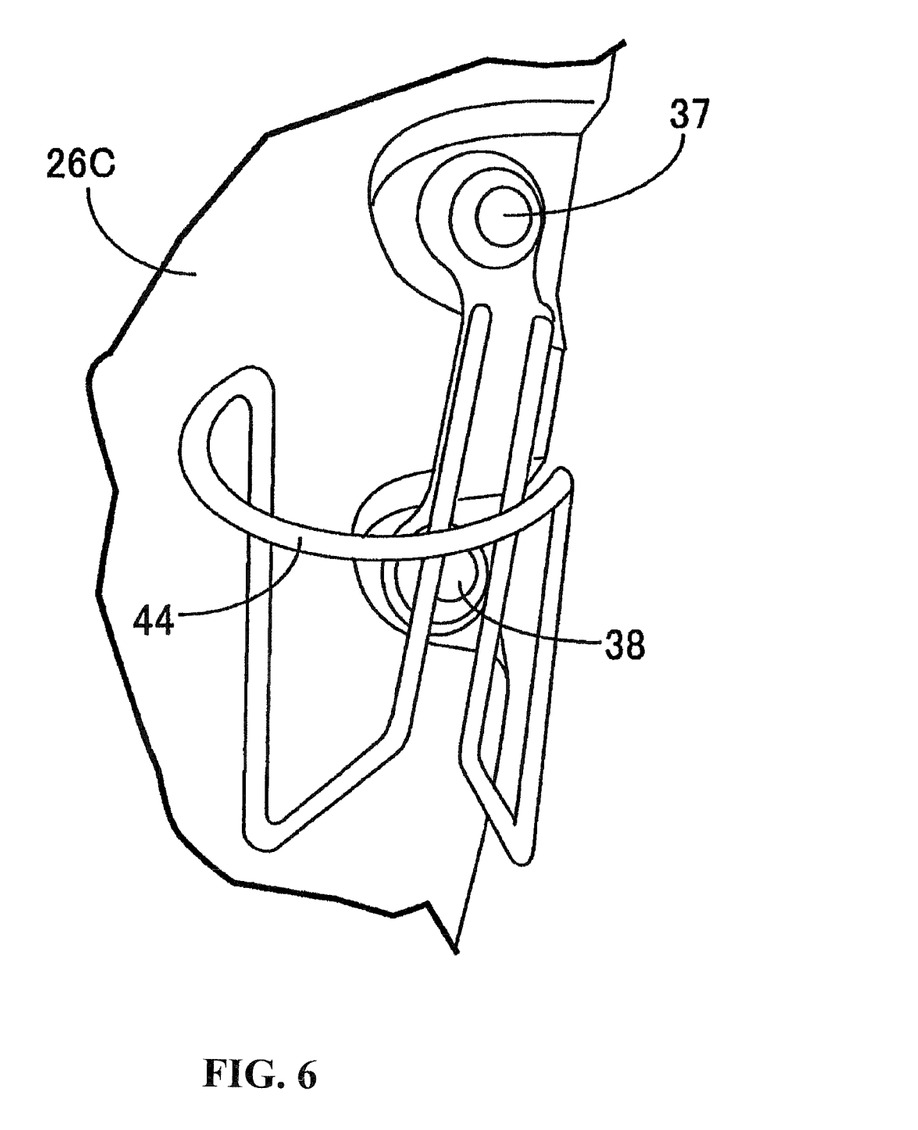
FIG. 6 is a perspective view of part of a side bag to which a side carrier is attached.

FIGS. 5 and 6 show a third embodiment of the present invention. Parts corresponding to those in the first embodiment are illustrated with the same reference signs, and detailed descriptions for such parts will be omitted.

Left and right side bags 26C are openably and closably supported by the fuel tank 22. A pair of fixing members 37, 38 and a hook 39, for example, are fixed to the outer side surface of each side bag 26C. The two fixing members 37, 38 are fixed to the respective positions which are vertically away from each other in the outer side surface of the side bag 26C. The hook 39 is fixed to a rear portion of the outer side surface of the side bag 26C.

As shown in FIG. 5, an elastic string 40 can be fixed to the fixing members 37, 38. When the elastic string 40 is brought into detachable engagement with the hook 39, the elastic string 40 can form a second article storage section 43 in cooperation with the outer side surface of the side bag 26C.

Furthermore, as shown in FIG. 6, a side carrier 44 can be attached to the fixing members 37, 38.

According to the third embodiment, the fixing members 37, 38 to which the elastic string 40 or the side carrier 44 can be fixed, and the hook 39 with which the elastic string 40 is brought into detachable engagement in the way that the elastic string 40 forms the second article storage section 43 in cooperation with the outer side surface of the side bag 26C, are fixed to the outer side surface of the side bag 26C. For this reason, the loading capacity can be increased further by fixing the side carrier 44 to the fixing members 37, 38, or by forming the second article storage section 43 by bringing the elastic string 40, which is fixed to the fixing members 37, 38, into engagement with the hook 39.

Although the foregoing descriptions have been provided for the embodiments of the present invention, the present invention is not limited to the above-described embodiments. Various design modifications may be made to the present invention without departing from the present invention recited in the scope of claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle comprising:
a vehicle body frame including:
a head pipe steerably supporting a steering handlebar; and
a main frame extending rearwardly and downwardly from the head pipe;
a riding seat supported by the vehicle body frame;
a fuel tank disposed between the steering handlebar and the riding seat, said fuel tank being supported by the main frame; and
an article storage section disposed in front of the riding seat, and extending further outwardly relative to the fuel tank;
wherein a pair of left and right side bags are openably and closably supported by the fuel tank and the article storage section is formed between each side bag and an outer side surface of the fuel tank and
wherein the side bags turn on axes of pivots disposed lower than a bottom face of the fuel tank.

2. The motorcycle according to claim 1, wherein the pivots are supported by a stay which is fixedly provided to the fuel tank wherein the stay extends further downwardly than the bottom face of the fuel tank; and
a lower end of the stay is disposed higher than a lower edge of each side bag in a closed state.

3. The motorcycle according to claim 2, wherein fixing members to and a hook are fixed to an outer side surface of the side bag, and an elastic string is detachably engaged with the fixing members and the hook, in such a way that the elastic string forms a second article storage section in cooperation with an outer side surface of the side bag, and wherein a side carrier is adapted to be fixed to the outer side surface of the side bag.

4. The motorcycle according to claim 2, and further including a net member secured to an interior surface of at least one of the left and right side bags for preventing articles positioned within at least one of the left and right side bags from falling out.

5. The motorcycle according to claim 1, wherein fixing members and a hook are fixed to an outer side surface of the side bag, and an elastic string is detachably engaged with the fixing members and the hook, in such a way that the elastic string forms a second article storage section in cooperation with an outer side surface of the side bag, and wherein a side carrier is adapted to be fixed to the outer side surface of the side bag.

6. The motorcycle according to claim 1, and further including a net member secured to an interior surface of at least one of the left and right side bags for preventing articles positioned within at least one of the left and right side bags from falling out.

7. A motorcycle comprising:
a riding seat supported by a vehicle body frame;
a fuel tank disposed in a forward direction relative to the riding seat; and
an article storage section disposed in front of the riding seat, and extending further outwardly relative to the fuel tank;
wherein a pair of left and right side bags are openably and closably supported by the fuel tank and the article storage section is formed between each side bag and an outer side surface of the fuel tank and wherein the side bags turn on axes of pivots disposed lower than a bottom face of the fuel tank.

8. The motorcycle according to claim 7, wherein the pivots are supported by a stay which is fixedly provided to the fuel tank wherein the stay extends further downwardly than the bottom face of the fuel tank; and
a lower end of the stay is disposed higher than a lower edge of each side bag in a closed state.

9. The motorcycle according to claim 8, wherein fixing members to which one of an elastic string and a hook are fixed to an outer side surface of the side bag, said hook detachable engaging the elastic string in such a way wherein the elastic string forms a second article storage section in cooperation with an outer side surface of the side bag, and a side carrier fixed to the outer side surface of the side bag.

10. The motorcycle according to claim 8, and a net member secured to an interior surface of at least one of the left and right side bags for preventing articles positioned within at least one of the left and right side bags from falling out.

11. The motorcycle according to claim 7, wherein fixing members and a hook are fixed to an outer side surface of the side bag, and an elastic string is detachably engaged with the fixing members and the hook, in such a way that the elastic string forms a second article storage section in cooperation with an outer side surface of the side bag, and wherein a side carrier is adapted to be fixed to the outer side surface of the side bag.

12. The motorcycle according to claim 7, and a net member secured to an interior surface of at least one of the left and right side bags for preventing articles positioned within at least one of the left and right side bags from falling out.

13. A motorcycle comprising:
a vehicle body frame including:
a head pipe steerably supporting a steering handlebar; and a main frame extending rearwardly and downwardly from the head pipe;
a riding seat supported by the vehicle body frame;
a fuel tank disposed between the steering handlebar and the riding seat, said fuel tank being supported by the main frame; and
an article storage section disposed in front of the riding seat, and extending further outwardly relative to the fuel tank;
wherein a pair of left and right side bags are openably and closably supported by the fuel tank and the article storage section is formed between each side bag and an outer side surface of the fuel tank and
wherein fixing members and a hook are fixed to an outer side surface of the side bag, and an elastic string is detachably engaged with the fixing members and the hook, in such a way that the elastic string forms a second article storage section in cooperation with an outer side surface of the side bag, and wherein a side carrier is adapted to be fixed to the outer side surface of the side bag.

14. The motorcycle according to claim 13, and further including a net member secured to an interior surface of at least one of the left and right side bags for preventing articles positioned with in at least one of the left and right side bags from falling out.

15. A motorcycle comprising:
a riding seat supported by a vehicle body frame;
a fuel tank disposed in a forward direction relative to the riding seat; and
an article storage section disposed in front of the riding seat, and extending further outwardly relative to the fuel tank;
wherein a pair of left and right side bags are openably and closably supported by the fuel tank wherein the article storage section is formed between each side bag and an outer side surface of the fuel tank;
wherein fixing members and a hook are fixed to an outer side surface of the side bag, and an elastic string is detachably engaged with the fixing members and the hook, in such a way that the elastic string forms a second article storage section in cooperation with an outer side surface of the side bag, and wherein a side carrier is adapted to be fixed to the outer side surface of the side bag.

16. The motorcycle according to claim 15, and further including a net member secured to an interior surface of at least one of the left and right side bags for preventing articles positioned within at least one of the left and right side bags from falling out.

* * * * *